Nov. 14, 1933.  J. JONSSON  1,934,929
TRANSPORT WAGONS, ESPECIALLY FOR RAILWAYS
Filed May 28, 1931  2 Sheets-Sheet 1
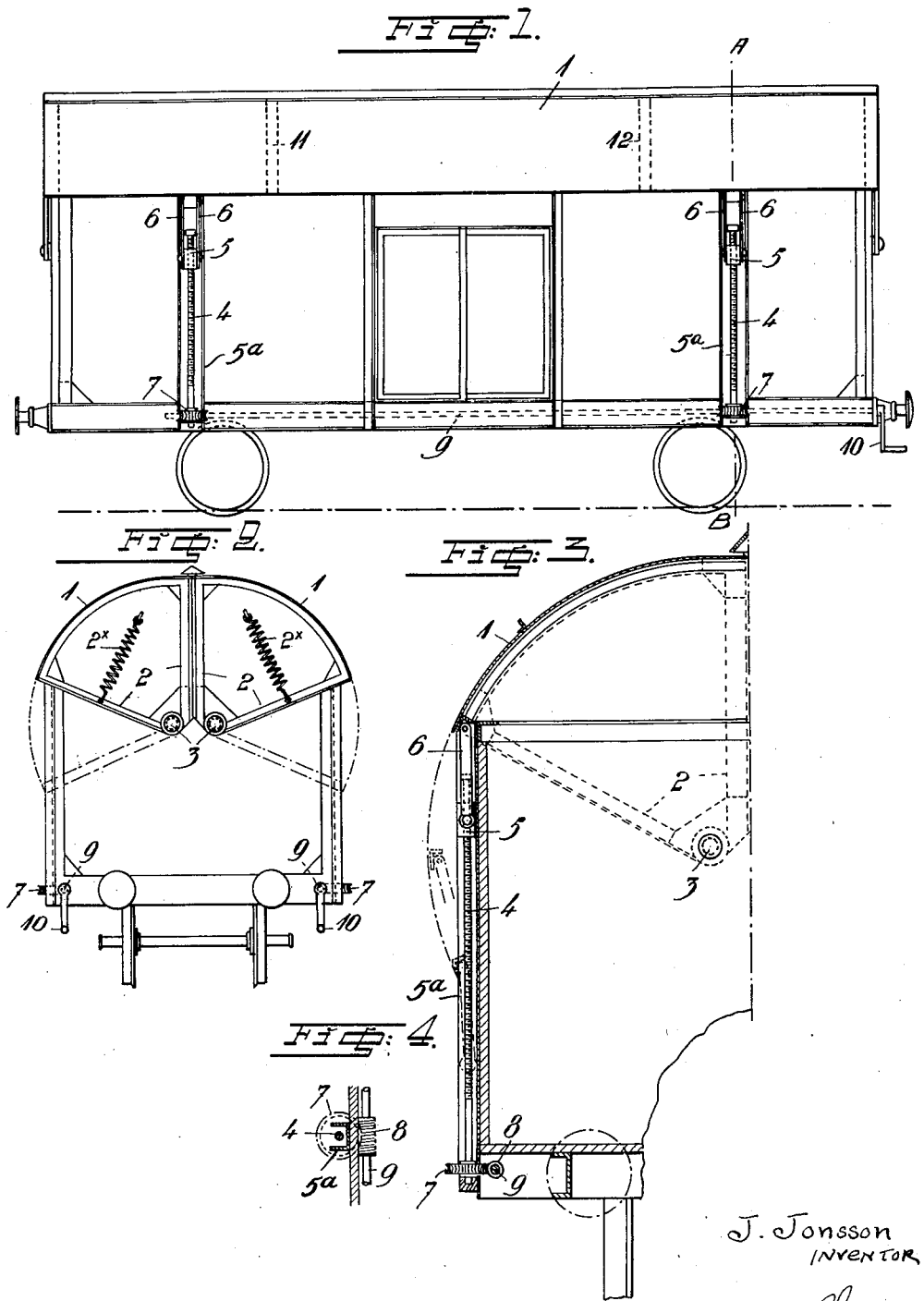

Nov. 14, 1933. J. JONSSON 1,934,929
TRANSPORT WAGONS, ESPECIALLY FOR RAILWAYS
Filed May 28, 1931 2 Sheets-Sheet 2
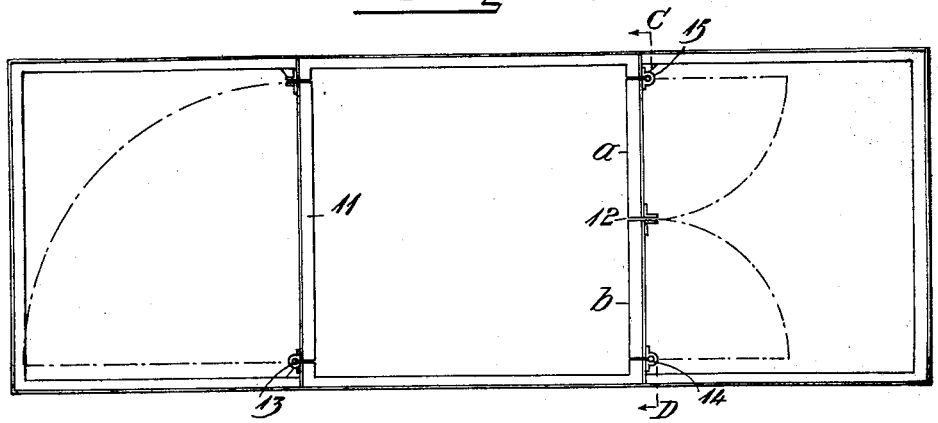
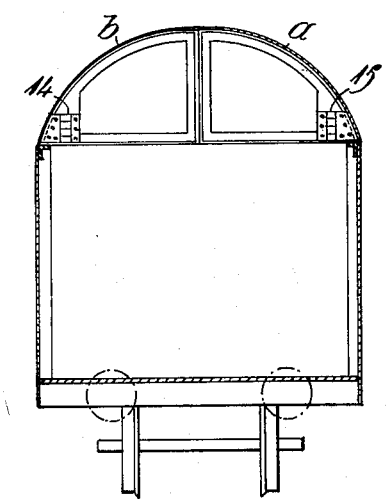
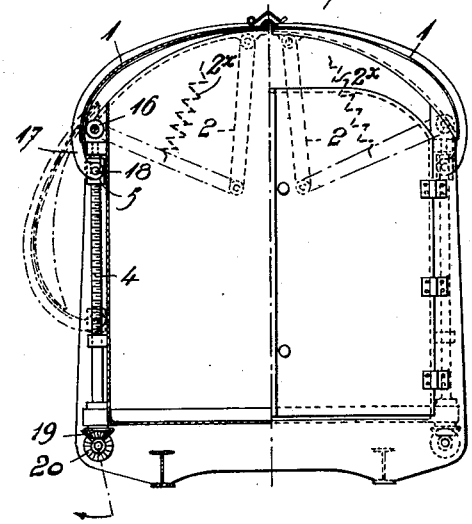
J. Jonsson
INVENTOR
By Marks & Clerk
Attys.

Patented Nov. 14, 1933

1,934,929

UNITED STATES PATENT OFFICE 1,934,929

TRANSPORT WAGONS, ESPECIALLY FOR RAILWAYS

Jonas Jonsson, Stockholm, Sweden, assignor to Jonsson, Arvas & Co., Stockholm, Sweden, a corporation of Sweden Application May 28, 1931, Serial No. 540,740, and in Sweden March 28, 1931

5 Claims. (Cl. 105—377)

This invention relates to transport wagons, especially for railways, of the type which are provided with a movable roof constituted by two swingable halves, connected to the one end-wall or both end-walls of the wagon by means of arm systems.

The mechanisms hitherto used for transmitting motion to the halves of the roof operate satisfactorily so far as regards short wagons, but experience has proved that in a wagon of increased length the span of the roof will be so great, that there enters a possibility of the roof becoming warped or being subjected to jamming action. Besides, the horizontal position of the motion-transmitting shafts at the top edges of the side walls of the wagon renders possible such an injury of the mechanism, that certain difficulties may arise in their operation.

According to the invention the transport wagon is provided with a movable roof, consisting of two swingable halves, and with mechanisms for shifting the same, which mechanisms are adapted to act upon the halves of the roof at points located between the ends of the wagon, so that the halves are well balanced during opening and closing movements and warping and jamming are obviated to the greatest possible degree.

The parts of the said mechanisms which are located nearest to the halves of the roof preferably consist of substantially vertical screw-spindles with nuts which are connected to the halves of the roof in a suitable manner. The said screw-spindles with nuts are connected with horizontal shafts by means of gearings, for instance worm gears, so that the halves of the roof may be swung into the open and the closed positions by means of the said horizontal shafts.

Preferably, the halves of the roof are supported intermediate their ends by swingable carriers arranged transversely of the wagon, which, after the halves of the roof have been swung into open position, may be swung outwards to the sides of the wagon and do not interfere with the loading and unloading of comparatively long articles.

Two forms of the invention are illustrated diagrammatically in the annexed drawings. Fig. 1 is a side view of a railway wagon constructed in accordance with the invention. Fig. 2 is an end view of the same. Fig. 3 is an enlarged cross-section on the line A—B in Fig. 1. Fig. 4 is a detail of the operating gear. Fig. 5 is a plan view of the railway wagon, with the roof removed. Fig. 6 is a section on the line C—D in Fig. 5. Fig. 7 is an end view partially a cross-section of an ordinary transport vehicle, for instance an automobile which has been provided with a roof constructed in accordance with the present invention.

According to Figs. 1 and 2 the two halves 1 of the roof are in known manner swingably mounted by means of arms 2 on trunnions 3 fixed to the end walls of the wagon. For the swinging of the halves of the roof into closed and open position special motion transmitting mechanisms are used, as already stated, which mechanisms are connected to the halves of the roof at points located between the ends of the wagon. Each of the said mechanisms comprises a vertical screw spindle 4 provided with a nut 5, which by means of links 6 are pivotally connected to the half of the roof. The said screw-spindles are journaled preferably in vertical U-shaped iron bars 5ª fixed to the side walls of the wagon, the bars also forming guides for the nuts 5. Worm-wheels 7 are fixed to the lower ends of the spindles and are engaged by worms 8 provided on a horizontal shaft 9 journaled in the frame of the wagon. Shafts 9 are provided with cranks 10 through the rotation of which the halves of the roof are opened and closed. The open position of the halves of the roof is shown by dotted lines in Figs. 2 and 3.

The screw-spindles 4, nuts 5 and link 6 constitute simple and reliable means for transmitting the motion to and operating the halves of the roof. Owing to the fact that the points at which the halves of the roof are acted upon are located between the ends of the latter disadvantageous warping and jamming actions are obviated. By journaling the shafts 9 in the substantially rigid frame of the wagon or in the vicinity of the same they are not subjected to warping or bending motions which the body of the wagon ordinarily undergoes during travel. Besides, the journaling of the shafts 9 in the frame of the wagon involves the advantage that their weight is located as far downward as possible in the wagon. For facilitating the swinging of the halves of the roof into their closed position the arms 2 may be acted upon by coil-springs 2ˣ fixed to end-walls of the wagon, see Fig. 2.

It is suitable in long wagons to support the halves of the roof at two places at least with regard to their length. For that reason suitable carriers are provided transversely of the wagon. According to Figs. 5 and 6 the said carriers consist of curved members 11 and 12 which are so constructed that they may be moved aside, so that they do not interfere with the loading or unloading of comparatively long articles. For that purpose the curved members may be swingable either as a whole or the members may be constituted by two separately swingable parts. Thus, the left part of Fig. 5 shows the curved member 11 swingable on a hinge 13, so that it may be swung to a position close to the side of the wagon. The right part of Fig. 5 shows the curved member 12 divided into two parts $a$ and $b$, which are each swingable on hinges 14 and 15. The construction last mentioned is shown also in Fig. 6.

If the invention is applied to an ordinary transport vehicle for instance an automobile, see Fig. 7, it is often suitable that the rear end wall be constituted by two doors. In this case it is not necessary to provide any arm 2 at the rear end wall. Owing to the fact that such carts generally are not so long as railway cars, sufficient guiding of the halves of the roof is procured by the arms 2 at the front wall. Rollers 16 may be provided at the top part of side walls, which support the rear ends of the halves 1 of the roof. The nuts 5 provided on the screw-spindles 4 may be connected directly to the halves of the roof for which purpose brackets 17 extending from the halves of the roof are connected to the nuts by trunnions 18. Consequently, the links 6 are dispensed with in this case. Instead of worm and worm-wheels 7 and 8 toothed gear wheels 19 and 20 may be used.

Many other modifications of the construction may, evidently, be made without exceeding the limits of the invention.

I claim:—

1. In a vehicle, a frame, sides and a movable roof consisting of swingable halves, motion transmitting mechanisms for shifting said halves, said mechanisms being journaled in said frame and on the sides of the vehicle, and means for connecting said mechanisms with the halves of the roof at the sides of the vehicle on points located between the ends of the vehicle at a distance from the ends of the roof.

2. A vehicle as claimed in claim 1, characterized in that each motion transmitting mechanism comprises a horizontal driving shaft, journalled in the frame of the vehicle, substantially vertical screw-spindles with nuts, located at the sides of the vehicle, gearings between the shaft and the screw-spindles and connections between the nuts and the halves of the roof.

3. A vehicle as claimed in claim 1, characterized by provision of springs acting on the halves of the roof adapted to facilitate the swinging of the halves into closed position.

4. A vehicle as claimed in claim 1, characterized by the provision of carriers extending transversely of the vehicle and supporting the halves of the roof, said carriers being swingable whereby they may be placed at the sides of the vehicle.

5. In a vehicle, a frame, sides and a movable roof, consisting of swingable halves, motion transmitting mechanisms for shifting said halves, said mechanisms being journaled in the frame and on the sides of the vehicle, means for connecting said mechanisms with the halves of the roof at the sides of the vehicle on points located between the ends of the vehicle at a distance from the ends of the roof, arms located at the one end of the vehicle and guiding the said halves during their movement, and rollers provided at the other end of the vehicle for supporting the said halves during the swinging of the same.

JONAS JONSSON.